US012351033B2

(12) United States Patent
Michel

(10) Patent No.: US 12,351,033 B2
(45) Date of Patent: Jul. 8, 2025

(54) POWER TRANSMISSION ASSEMBLY AND VEHICLE COMPRISING THIS ASSEMBLY

(71) Applicant: IDEE SERVICES, Evecquemont (FR)

(72) Inventor: Luc Michel, Evecquemont (FR)

(73) Assignee: IDEE SERVICES, Evecquemont (FR)

( * ) Notice: Subject to any disclaimer, the term of this patent is extended or adjusted under 35 U.S.C. 154(b) by 0 days.

(21) Appl. No.: 17/768,112

(22) PCT Filed: Oct. 1, 2020

(86) PCT No.: PCT/FR2020/051728
§ 371 (c)(1),
(2) Date: Apr. 11, 2022

(87) PCT Pub. No.: WO2021/069819
PCT Pub. Date: Apr. 15, 2021

(65) Prior Publication Data

US 2024/0278634 A1 Aug. 22, 2024

(30) Foreign Application Priority Data

Oct. 11, 2019 (FR) ...................................... 1911321

(51) Int. Cl.
*B60K 6/44* (2007.10)
*B60K 6/36* (2007.10)
*B60K 6/445* (2007.10)
*B60K 1/00* (2006.01)

(52) U.S. Cl.
CPC ................ *B60K 6/445* (2013.01); *B60K 6/36* (2013.01); *B60K 2001/001* (2013.01); *B60Y 2400/73* (2013.01)

(58) Field of Classification Search
CPC .... B60K 6/445; B60K 6/36; B60K 2001/001; B60K 2007/0092; F16H 48/24; F16H 48/22; F16H 37/082; B60Y 2400/73
See application file for complete search history.

(56) References Cited

U.S. PATENT DOCUMENTS

2003/0010547 A1 1/2003 Wachauer
2005/0124451 A1* 6/2005 Morikawa ......... H01M 8/04225 475/6
2006/0116233 A1* 6/2006 Gradu .................. B60K 17/145 475/276
2007/0029893 A1* 2/2007 Schuler ................ B60N 2/2352 310/239

(Continued)

FOREIGN PATENT DOCUMENTS

DE 10049197 A1 4/2002
EP 1817197 A 8/2007

(Continued)

OTHER PUBLICATIONS

International Search Report related to PCT/FR2020/051728; reported on Feb. 5, 2021.

*Primary Examiner* — Farhana Pervin
(74) *Attorney, Agent, or Firm* — von Briesen & Roper, s.c.

(57) ABSTRACT

Power transmission assembly for a vehicle comprising an electric machine, and a differential connected to the electric machine. The electric machine is an inverted machine in which the rotor is radially outside the stator with respect to the rotation axis of the electric machine. The differential consists of cogwheels distributed around the electric machine.

12 Claims, 4 Drawing Sheets

(56) References Cited

U.S. PATENT DOCUMENTS

| | | | | |
|---|---|---|---|---|
| 2011/0124460 | A1 | 5/2011 | Karlsson et al. | |
| 2014/0323259 | A1* | 10/2014 | Sugiyama | B60K 17/12<br>475/150 |
| 2018/0363755 | A1* | 12/2018 | Wakui | B60T 1/062 |
| 2020/0062114 | A1* | 2/2020 | Holmes | F16H 48/05 |
| 2021/0018069 | A1* | 1/2021 | Conlon | F16H 48/05 |
| 2021/0394602 | A1* | 12/2021 | Schilder | F16H 3/66 |

FOREIGN PATENT DOCUMENTS

| | | | |
|---|---|---|---|
| JP | 2005138824 | A | 6/2005 |
| WO | 0156138 | A1 | 8/2001 |
| WO | 2006060348 | A1 | 6/2006 |
| WO | 2014193297 | A1 | 12/2014 |
| WO | 2016032390 | A1 | 3/2016 |

* cited by examiner

POWER TRANSMISSION ASSEMBLY AND VEHICLE COMPRISING THIS ASSEMBLY

CROSS-REFERENCE TO RELATED APPLICATION

This Application is a 35 USC § 371 US National Stage filing of International Application No. PCT/FR2020/051728 filed on Oct. 1, 2020 and claims priority under the Paris Convention to French Patent Application No. 1911321 filed on Oct. 11, 2019.

TECHNICAL FIELD OF THE DISCLOSURE

The present invention relates to a power transmission assembly for producing an electric vehicle or a hybrid vehicle.

STATE OF THE ART

More particularly, the invention relates to a power transmission assembly for producing an electric vehicle or a hybrid vehicle (comprising a combustion engine and an electric motor). For example, the power transmission assembly makes it possible to transform a combustion vehicle into a hybrid vehicle or to transform a combustion vehicle into an electric vehicle.

For example, the power transmission assembly makes it possible to produce a four-wheel drive vehicle or to transform a two-wheel drive vehicle into a four-wheel drive vehicle. For example, the power transmission assembly makes it possible to transform a vehicle with a combustion engine which actuates the front axle (front-wheel drive type vehicle having two driving wheels at the front) into a four-wheel drive vehicle in which an electrical motor of this assembly is intended to be directly or indirectly linked to the rear axle of this vehicle. Conversely, it is possible to transform a combustion vehicle of the rear-wheel drive type into a four-wheel drive vehicle, the power transmission assembly then being directly or indirectly linked to the front axle of the vehicle.

In particular, the power transmission assembly comprises:

- an electric machine comprising a stator fixed relative to the vehicle and a rotor movable in rotation relative to a rotation axis of said electric machine, said electric machine being intended to transmit motive power and its rotation to the wheels of an axle of the vehicle, or conversely to slow down the rotation of said wheels, for example by retrieving electrical energy to be stored in batteries, and
- a differential comprising at least one differential input connected to the rotor of the electric machine, said differential comprising a plurality of cogwheels connected with each other to distribute the differential input power between:
  - a first output intended to be connected to a first power transmission shaft transmitting power to a first wheel, and
  - a second output intended to be connected to a second power transmission shaft transmitting power to a second wheel, the distribution being a function of the rotation speed of the first output and second output.

An electric machine can be led to be in an electric motor mode in which the electric power is transformed into rotational mechanical power, or conversely in an electric generator mode in which the rotational mechanical power is transformed into electric power. In the latter case, the machine is transformed into a brake with energy recovery in electrical form, wherein this electrical energy can of course be stored in the vehicle batteries.

For example, U.S. Pat. No. 8,672,068 proposes a power transmission assembly of this type.

This assembly is directly installed in the rear axle, and the rotation axis of the electric motor is coaxial with the transverse shaft of the rear axle structure (in French: "pont arrière") of the vehicle.

However, this assembly is bulky and difficult to set up into the available space of the vehicle rear axle.

DISCLOSURE OF THE INVENTION

The purpose of the present disclosure is to propose a solution which is easier to set up in the space of a front and/or rear axle of a vehicle.

To this end, the present disclosure relates to a power transmission assembly in which:

- the cogwheels are distributed around the electric machine, the electric machine being located inside the space of the differential, and
- the electric machine is an inverted machine in which the rotor is radially outside the stator with respect to the rotation axis of the electric machine.

A power transmission assembly is obtained which is more compact than in the prior art (at equivalent power), and therefore easier to incorporate when motorizing a vehicle front and/or rear axle.

The installation of the assembly on the vehicle is then easier, in particular when it is a question of modifying a two-wheel drive series vehicle to transform it into a four-wheel drive vehicle or to transform a combustion vehicle into an electric vehicle or to transform a combustion vehicle into a hybrid vehicle. Indeed, the installation can be carried out by modifying few elements of this vehicle.

In addition, the electric machine of this power transmission assembly can:

- either assist the combustion engine in the electric motor mode,
- either slow the vehicle down in the electric generator mode, for example while recharging batteries.

Thanks to such operating in which the electric machine is led as a brake or as a support of a main motor such as a combustion engine, it is possible to optimize the operation of the combustion engine in operation. It is also possible to reduce the size thereof. Substantial energy savings can therefore be achieved.

In various embodiments of the power transmission assembly according to the present disclosure, one and/or the other of the following arrangements can possibly be used.

The electric machine of the inverted type, with the rotor on the outside, makes it possible to increase the torque of this electric machine at low rotation speed, and makes it possible to achieve an even further reduced size. Thus, the electric machine is better suited to a low-speed operating mode.

According to an aspect, the rotor comprises:

- a lateral flange which extends radially from the rotation axis, and
- a cylindrical part carrying magnets having alternating polarities in the circumferential direction of this cylindrical part, said magnets facing the windings of the stator.

According to an aspect, the assembly further comprises a coupler connected between the electric machine and the differential.

According to an aspect, the coupler is a dog coupling or a clutch, said coupler being actuated by mechanical, hydraulic or electrical action.

In an aspect, the differential includes the following cogwheel subassemblies:

- a first epicyclic gearing arranged along the rotation axis AX on a first side of the electric machine,
- a second epicyclic gearing arranged along the rotation axis AX on a second side of the electric machine, and opposite the first side, and
- a linking mechanism which links the first epicyclic gearing to the second epicyclic gearing, the first and second epicyclic gearings being identical.

According to an aspect, the first epicyclic gearing comprises a planet gear carrier corresponding to the first output of the differential, the second epicyclic gearing comprises a planet gear carrier corresponding to the second output of the second epicyclic gearing, a drive shaft linking the inner sun gear, of the first epicyclic gearing, the inner sun gear of the second epicyclic gearing and the rotor of the electric machine, the drive shaft corresponding to the differential input.

In an aspect, the linking mechanism includes:

- a first pinion which meshes on the outside of an outer ring gear of the first epicyclic gearing,
- a first toothed shaft connected to the first pinion,
- a second pinion which meshes on the outside of an outer ring gear of the second epicyclic gearing, and
- a second toothed shaft connected to the second pinion, the first toothed shaft meshing with the second toothed shaft to link, by rotational direction reversal, the outer ring gear of the first epicyclic gearing and the outer ring gear of the second epicyclic gearing.

According to an aspect, the assembly further comprises a command actuator adapted to lead the rotation of the first toothed shaft or the second toothed shaft, so as to control the differential effect of the differential.

According to an aspect, the linking mechanism comprises a bevel pinion, the first epicyclic gearing comprising an outer crown gear with a complementary conical seating surface for meshing with the bevel pinion, and the second epicyclic gearing comprising an outer crown gear with a complementary bevel conical seating surface for meshing with the bevel pinion.

According to an aspect, the assembly further comprises a command actuator adapted to lead the rotation of the bevel pinion, so as to control the differential effect of the differential.

The disclosure also relates to a vehicle comprising:

- a front axle,
- a rear axle, and
- a power transmission assembly of the aforementioned type, the transmission element of this assembly being directly or indirectly linked to the vehicle front axle and/or rear axle.

In various embodiments of the vehicle according to the present disclosure, one and/or the other of the following arrangements can possibly be used.

In an aspect, the front axle is coupled to a first motor, and the transmission assembly is linked to the rear axle so as to obtain a four-wheel drive vehicle.

In an aspect, the rear axle is coupled to a first motor, and the transmission assembly is linked to the front axle so as to obtain a four-wheel drive vehicle.

In an aspect, the assembly further comprises a coupler, and the coupler is placed in an uncoupled state if the speed of the vehicle is greater than a limit speed, adapted to the operating mode of the vehicle.

BRIEF DESCRIPTION OF THE DRAWINGS

Other features and advantages of the disclosure will become apparent from the description hereinafter of one embodiment thereof, given by way of non-limiting example, with reference to the appended drawings.

In the drawings.

In the various figures, the same numerical references designate identical or similar elements.

DETAILED DESCRIPTION OF THE DISCLOSURE

Figure 1:
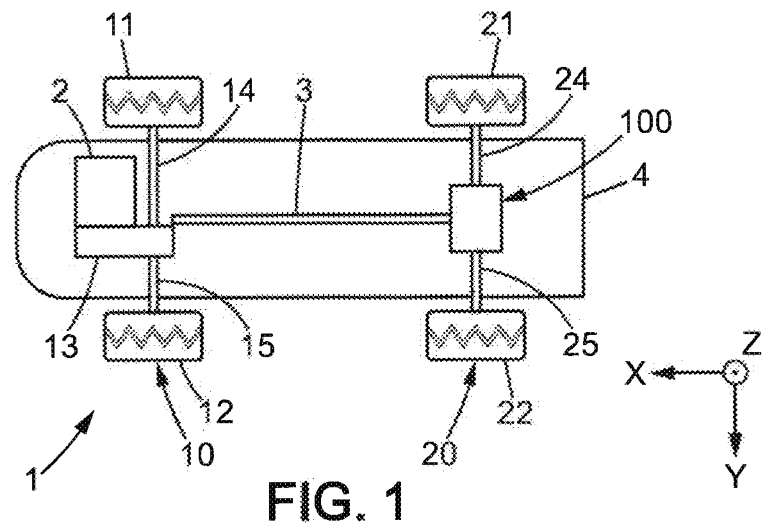
FIG. 1 is a schematic top view of a vehicle.

FIG. 1 is a schematic top view of a vehicle 1 according to the present disclosure. This vehicle 1 is, for example, a two-axle vehicle, comprising:

- a chassis 4,
- a front axle 10 coupled to a first motor 2, and
- a rear axle 20.

In this example shown in FIG. 1, the front axle 10 is coupled to a first motor 2. However, all the variants mentioned in the introduction are possible.

The first motor 2 is for example internal combustion engine, or possibly a first electric motor.

The front axle 10 includes a wheel on the right 11, a wheel on the left 12, and a traction unit 13 which couples the first motor to the wheels on the right and on the left 11, 12 via traction shafts 14, 15. The traction unit 13 includes for example a gearbox, and a differential device for distributing the power between the wheels on the right and on the left of the front axle 10.

The rear axle 20 includes a wheel on the right 21, a wheel on the left 22, and a power transmission assembly 100. The power transmission assembly 100 incorporates or includes a differential 133 to distribute power between the wheels on the right and on the left 21, 22 of the rear axle 20, via propulsion shafts 24, 25.

Optionally, the vehicle 1 is initially a traditional type four-wheel drive vehicle, that is to say a four-wheel drive vehicle powered by the first motor 2. The vehicle further comprises a transfer shaft 3 which also couples the traction unit 13 to the rear axle 20 so as to deliver part of the motive power of the first motor 2 to the wheels of the rear axle 20. This transfer shaft 3 is usually coupled to a meshing ring gear of the differential by a bevel pinion.

Other mechanical elements are usually implemented in such a mechanical chain, in particular, for example, universal joints to allow wheel movements, and various other couplings and mechanisms . . . .

Figure 2:
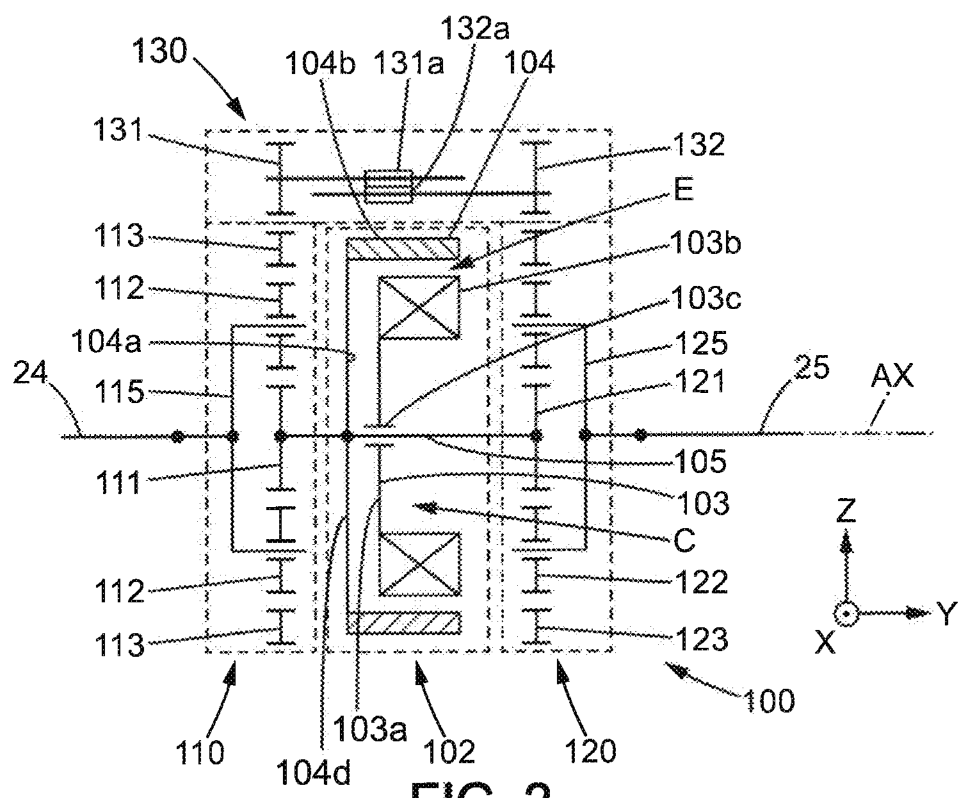
FIG. 2 is a schematic view of an embodiment of a power transmission.
Figure 3:
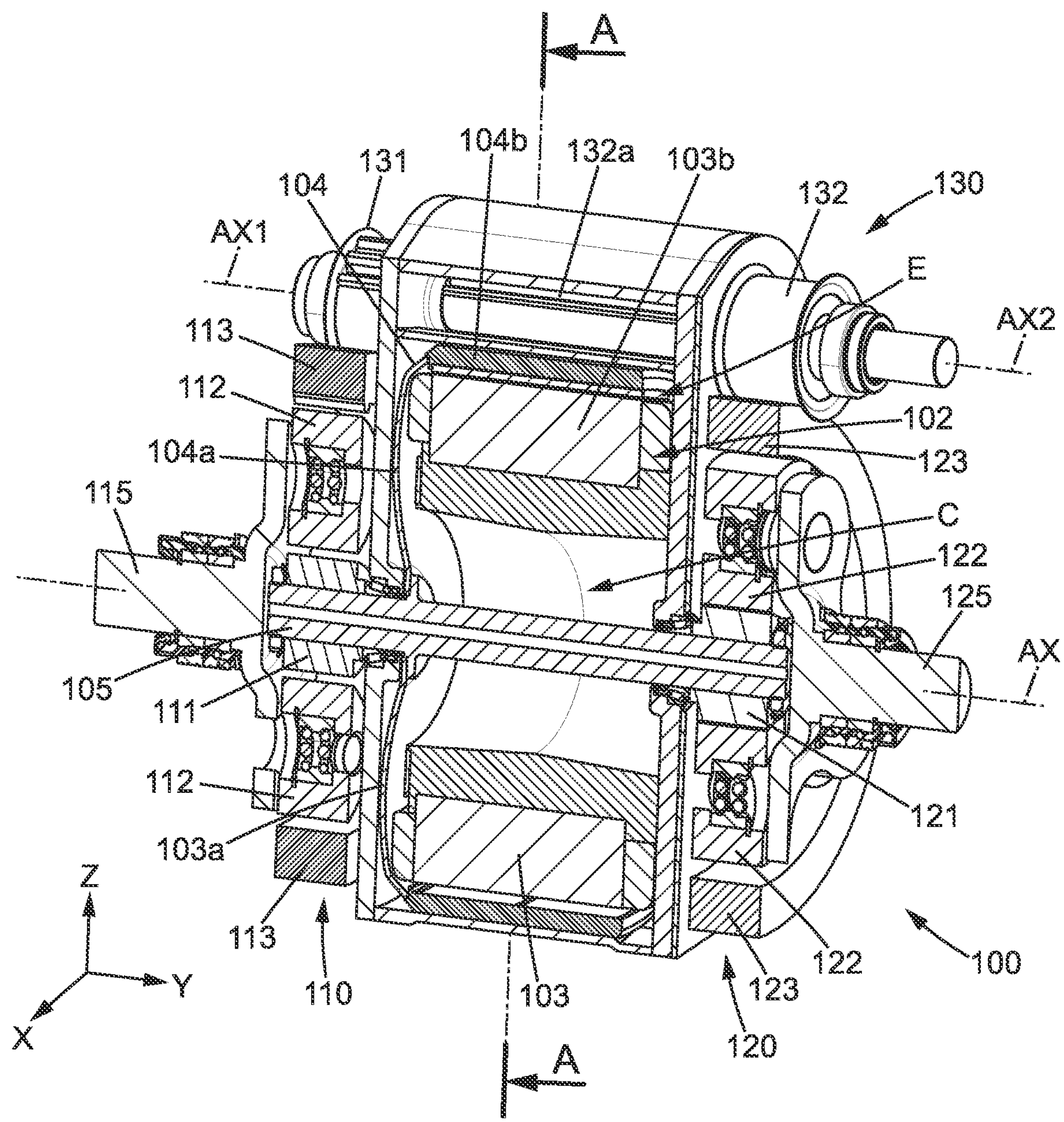
FIG. 3 is a view of an implementation example of the power transmission of FIG. 2.
Figure 4:
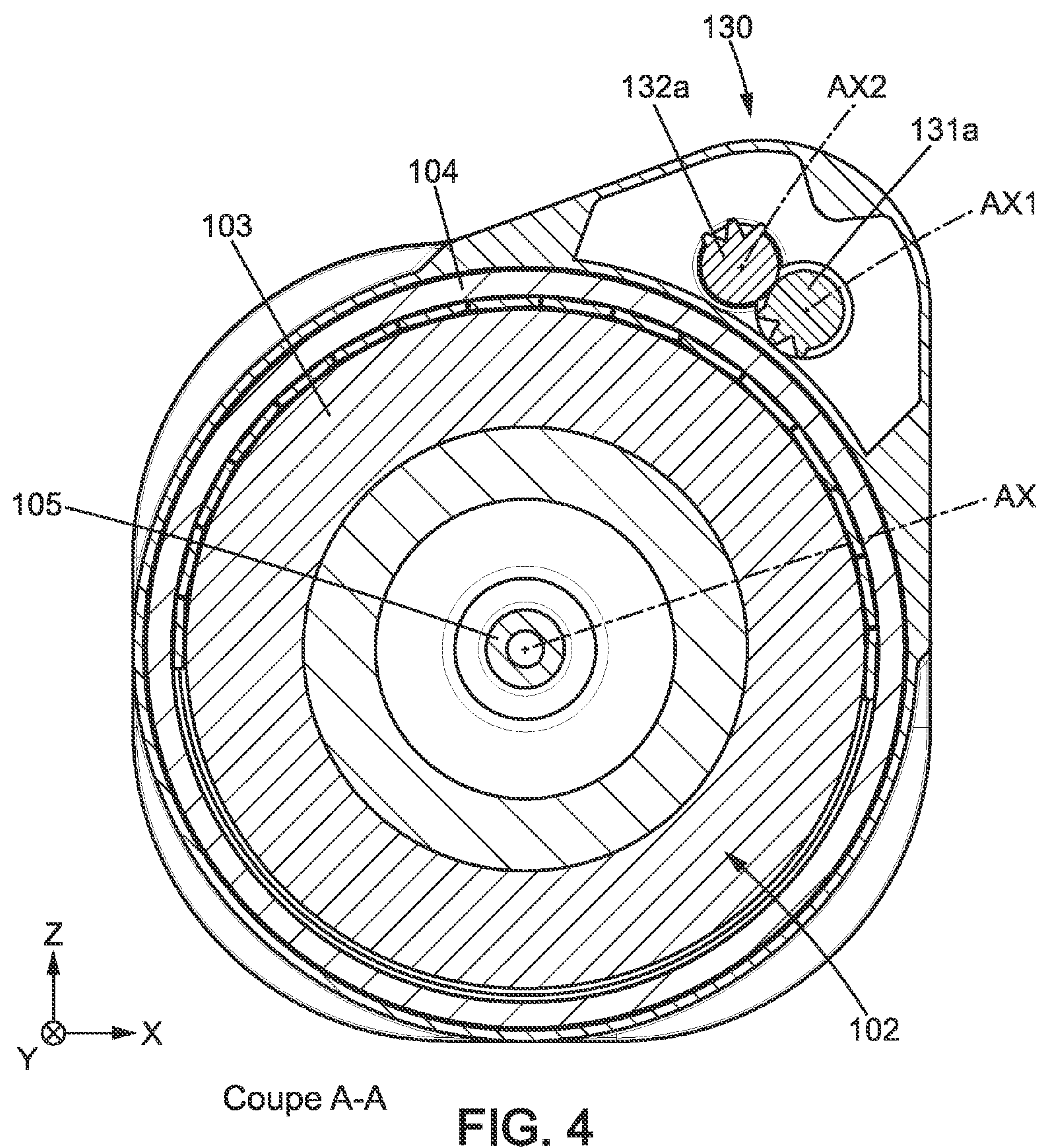
FIG. 4 is the sectional view A-A from the example of FIG. 3.

FIGS. 2 to 5 show an embodiment of a power transmission assembly according 100 to the present disclosure. FIG. 2 is a schematic view for understanding the operation, and FIGS. 3 and 4 show an implementation example of this embodiment of the power transmission assembly 100.

The power transmission assembly 100 includes:

- an electric machine 102 comprising a stator 103 fixed relative to the chassis 4 of the vehicle 1 and a rotor 104 movable in rotation relative to a rotation axis AX of the electric machine 102, and
- a differential 133 comprising a differential input connected to the rotor 104 of the electric machine, the differential comprising a plurality of cogwheels connected with each other to distribute the differential input power, between:
  - a first output S1 intended to be connected to a first power transmission shaft transmitting power of a first wheel, for example the propulsion shaft 24, and
  - a second output S2 intended to be connected to a second power transmission shaft transmitting power of a second wheel, for example the propulsion shaft 25, the distribution being a function of the rotation speed of the first output S1 and of the second output.

The electric machine 102 of this transmission assembly 100 according to the disclosure is in fact for example capable of operating in motor mode and/or in electric generator mode. This electric machine 102 is possibly an inverted machine in which the rotor 104 is radially outside the stator 103 with respect to the rotation axis AX. But, a conventional machine with a rotor inside the stator can be made. The rest of the description presents the first solution with an inverted machine, which is unusual but has advantages in terms of dimensions, as explained below.

Furthermore, the cogwheels of the differential 133 are distributed around the electric machine 102, the electric machine being the located inside the volume of the differential.

Thanks to these arrangements, the transmission assembly 100 is a compact device. This transmission assembly 100 is capable of transmitting electric motive power (for example) to the front axle 10 or to the rear axle 20, with little loss and with a high torque.

The electric machine 102 is an electric motor and/or an electric generator. For example, the electric machine in motor mode is capable of assisting a first (combustion) motor of the vehicle. For example, the electric machine in generator mode is capable of slowing the vehicle down, possibly while recharging batteries. This electric machine is advantageously a machine of the synchronous type.

The stator 103 comprises a stator body 103*a* equipped with windings 103*b* on the outer periphery of this stator 103, and a bearing 103*c* on the rotation axis AX of the motor. As shown in the figure, the bearing 103*c* is for example articulated in rotation around a drive shaft 105, this drive shaft 105 being itself articulated in rotation around the rotation axis AX, directly or indirectly relative to the vehicle chassis 4 (not shown).

The stator 103 thus comprises an annular cavity C between the windings 103*b* and the rotation axis AX. Part of the cogwheels of the differential 133 can then possibly be housed inside the cavity. A coupler (as explained below) can be housed inside the cavity. In addition, this structure makes it possible to increase the cross-section of the windings 103*b* by reducing the volume of this cavity C. On design, this makes it possible to increase the copper sectional area, and therefore this makes it possible to increase the torque generated by the electric machine 102. In this way, the transmission assembly 100 is very compact.

The rotor 104 comprises a rotor body 104*a* equipped with magnets 104*b* coming opposite the windings 103*b* of the stator. The rotor body 104*a* comprises for example a lateral flange 104*c* which extends radially from the rotation axis AX, and an outer cylindrical part 104*d* carrying the magnets 104*b*. The magnets 104*b* are positioned on the inner periphery of said cylindrical part 104*d* to face the windings 103*b*, and are positioned with alternating polarities along the circumferential direction of the circumference of this cylindrical part 104*d*.

Thus, in the inverted machine presented, the windings 103*b* are located on the stator, in the internal part of the electric machine 102 (close to the rotation axis AX) and the magnets 104*b* are located on the rotor, in the external part of the electrical machine 102 (outside the stator). However, the windings 103*b* have a radial size (in a direction perpendicular to the rotation axis AX) greater than the magnets 104*b*. The air gap E of the motor is the cylindrical area between stator 103 and rotor 104. At a constant air gap diameter E, an electric machine of the inverted type then has a smaller radial size and/or a higher torque compared to a non-inverted electric machine.

The rotor 104 of the electric machine 102 is then made integral (directly or indirectly) to the drive shaft 105 to drive it in rotation, this drive shaft 105 then corresponding to the input of the differential 133.

Thus, thanks to this arrangement, the electric machine of the present disclosure is more efficient, in particular for example with respect to its use in a four-wheel drive vehicle 1 for a low running speed of said vehicle.

In addition, the transmission assembly 100 can include a coupler (not shown in FIG. 2) between the rotor 104 of the electric machine 102 and the drive shaft 105 linked to the differential 133.

The coupler is adapted to switch between a coupled state in which the electric machine 102 can actuate the drive shaft 105 in rotation and an uncoupled state in which the electric machine 102 cannot actuate the drive shaft 105.

The coupler is therefore a mechanical coupling element between two elements, and can be led. This coupler is for example a dog coupling system or a clutch. The coupler can be actuated by mechanical, hydraulic or electrical action (not shown in FIG. 2).

This coupler thus makes it possible to uncouple the transmission assembly 100 when it is not useful for running the vehicle, which makes it possible to improve the overall the mechanical losses of this yield by eliminating assembly.

Possibly, when the vehicle is provided with several transmission assemblies 100, it is possible to mechanically couple or uncouple one or several of them, according to needs. Thus, the power transmission of the vehicle is more efficient and much more modular than the hybrid axle devices of the prior art.

FIG. 2 also shows a particular example of the differential 133 embodiment. Furthermore, it is shown as it would be used on a rear axle, i.e., with the first output S1 and the second output S2 connected to the propulsion shafts 24, 25 respectively.

In this embodiment, the differential 133 includes the following cogwheel subassemblies:

- a first epicyclic gearing 110 arranged along the rotation axis AX on a first side of the electric machine 102,
- a second epicyclic gearing 120 arranged along the rotation axis AX on a second side of the electric machine 102, and opposite the first side, and
- a linking mechanism 130 which links the first epicyclic gearing 110 to the second epicyclic gearing 120.

The first and second epicyclic gearings are advantageously identical and possibly symmetrically positioned on either side of the electric machine 102.

The first epicyclic gearing 110 comprises cogwheels, such as:

- an inner sun gear 111 connected to the drive shaft 105 having rotation axis AX,
- one or several planet gears 112 which mesh with the inner sun gear 111 around the rotation axis AX,
- an outer ring gear 113 which meshes on the outside of the planet gear(s) (i.e., at a distance from the rotation axis AX), and
- a planet gear carrier 115 which links the axis or axes of the planet gears 112.

The second epicyclic gearing 120 comprises cogwheels, such as:

- an inner sun gear 121 connected to the drive shaft 105 having rotation axis AX,
- one or several planet gears 112 which mesh with the inner sun gear 121 around the rotation axis AX,
- an outer ring gear 123 which meshes on the outside of the planet gear(s) (i.e., at a distance from the rotation axis AX) and
- a planet gear carrier 125 which links the axis or axes of the planet gears 122.

The planet gear carrier 115 of the first epicyclic gearing 110 corresponds to the first output S1 and it is then for example connected (made integral) with the propulsion shaft 24. Conversely, the planet gear carrier 125 of the second epicyclic gearing 120 corresponds to the second output S2 and it is then for example connected (made integral) with the propulsion shaft 25.

According to a first variant shown in FIGS. 2 to 4, the linking mechanism 130 consists of:

- a first pinion 131 which meshes on the outside of the outer ring gear 113 of the first epicyclic gearing 110,
- a first toothed shaft **131*a* connected (integral) to the first pinion 131**,
- a second pinion 132 which meshes on the outside of the outer ring gear 123 of the second epicyclic gearing 120, and
- a second toothed shaft **132*a* connected (integral) to the second pinion 132, the first toothed shaft 131*a* meshing (being engaged with) with the second toothed shaft 132*a* to link, by rotational direction reversal, the outer ring gear 113 of the first epicyclic gearing 110 and the outer ring gear 123 of the second epicyclic gearing 120**.

The assembly made of the first pinion 131 and of the first toothed shaft **131*a* is rotatably movable around a first rotation axis AX1, parallel to rotation axis AX. The assembly made of the second pinion 132 and of the second toothed shaft 132*a* is rotatably movable around a second rotation axis AX2, parallel to rotation axis AX. The first and second rotation axes AX1, AX2 are at a same distance from the rotation axis AX, and angularly offset around the rotation axis. The diagram of FIG. 2 being made in a plane comprising the rotation axis, represents only the operating principle of these axes, FIG. 3** then showing a more concrete embodiment.

Thanks to these arrangements, the two epicyclic gearings 110, 120 and the linking mechanism 130 behave like a mechanical differential. This differential assembly 133 remains compact.

In addition, the epicyclic gearings 110, 120 have a same rotation speed reduction ratio between the drive shaft 105 (the sun gear 111 or the sun gear 121) and the planet gear carriers 115, 125. This thus avoids the use of a traditional gear reducer at the output of the electric machine 102.

Differential 133 therefore cumulates the functions of a differential between outputs S1, S2 and of speed reduction for the electric machine 102. This differential 133 with cogwheels around the electric machine makes it possible to achieve a compact architecture.

FIGS. 3 and 4 show an exemplary embodiment for which the reference numerals designate elements that are identical or similar to those of FIG. 2, three-dimensional details of the power transmission assembly 100 are visible.

In particular, in these figures, it can be seen that the first axis AX1 of the first toothed shaft **131*a* and the second axis AX2 of the second toothed shaft 132*a*** are parallel to the rotation axis AX, but angularly offset around the rotation axis AX.

Furthermore, it is possible to lead the rotation of the first toothed shaft **131*a* or of the second toothed shaft 132*a*** by means of a rotation command actuator (not shown).

Thus:

1) if this command actuator is left inactive, the toothed shafts are free to be rotated and a differential effect is achieved between the first output S1 and the second output S2;
2) if this command actuator slows the toothed shafts down, it is possible to reduce or eliminate the differential effect between the first output S1 and the second output S2; and
3) if this command actuator is actuated, the differential effect can be led, which makes it possible to lead the axle direction of this differential, which makes it possible to control the direction or yaw angle of the vehicle.

Thus, the command actuator is capable of leading the differential effect between the first output S1 and the second output S2 by controlling the rotation speed of the first toothed shaft or of the second toothed shaft.

For example, the vehicle 1 includes a vehicle control electronic device which controls this command actuator so as to control the direction or yaw angle of the vehicle. Thus, the transmission assembly 100 becomes not only a power element which contributes to the vehicle progress, but also to the dynamic behavior thereof, in particular when cornering.

Figure 5:
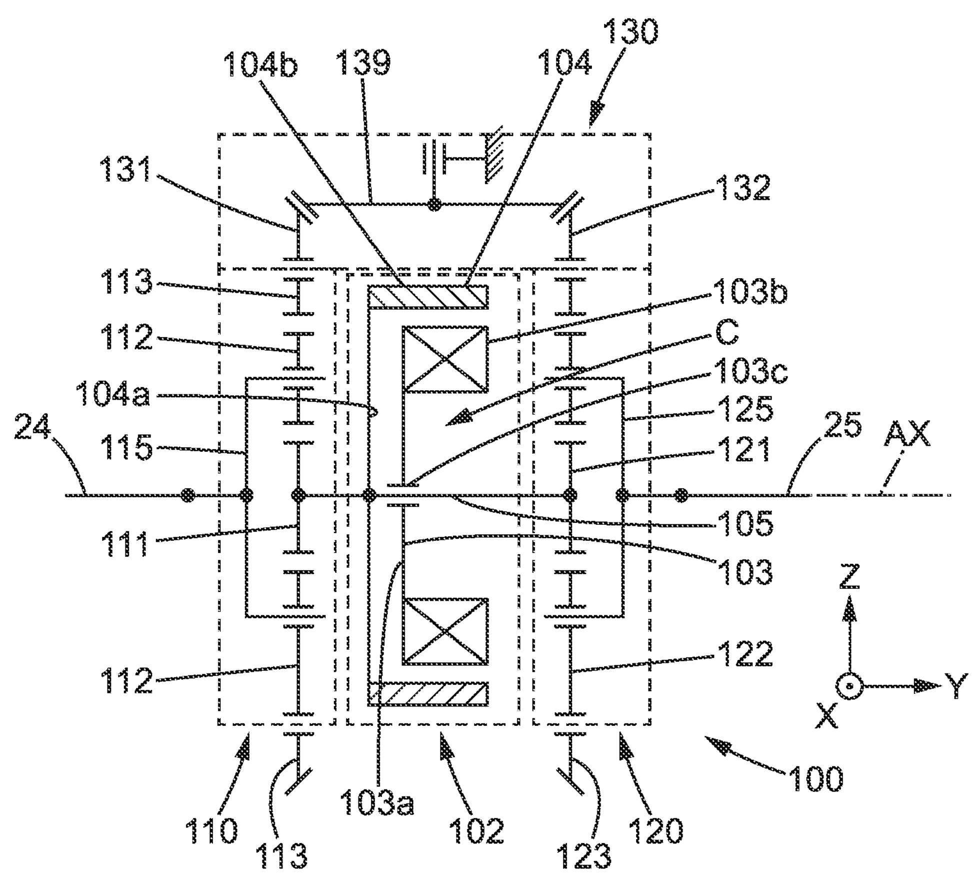
FIG. 5 is a schematic view of a variant of the embodiment of FIG. 2.

According to a second variant shown in FIG. 5, the linking mechanism 130 consists of a bevel pinion 139.

The outer crown gear 113 of the first epicyclic gearing 110 has a conical seating surface complementary to the bevel pinion and meshes with this bevel pinion. The outer crown gear 123 of the second epicyclic gearing 120 has a conical seating surface complementary to the bevel pinion and meshes with this bevel pinion. Thus, the outer ring gear 113 and the outer ring gear 123 have rotations in opposite directions.

Thanks to these arrangements, the two epicyclic gearings 110, 120 and the linking mechanism 130 behave like a mechanical differential. This differential assembly 133 remains compact.

The bevel pinion comprises a pinion shaft perpendicular to the rotation axis AX.

It is possible to lead the rotation of the pinion shaft by means of a rotation command actuator (not shown) similar to the first variant with two toothed shafts, to obtain the same effect of leading the differential effect, that is to say either to obtain a differential effect between the wheels, or to eliminate it, or to lead the direction or yaw angle of the vehicle. This leading of the directional effect will for example be implemented by some vehicle control electronic device as above. Thus, the transmission assembly 100 becomes not only a power element which contributes to the vehicle progress, but also to the dynamic behavior thereof, in particular when cornering.

Thus, the transmission assembly 100 according to the embodiments presented above can be incorporated into any vehicle type. For example, it can be incorporated into a four-wheel drive vehicle, by being linked incorporated to the front axle 10 or to the rear axle 20 of this vehicle.

Lastly, the coupler will advantageously be led by the vehicle 1 (the electronic device thereof) so that it is in an uncoupled state if the vehicle speed is greater than a speed limit. This speed limit is adapted to the operating mode of the vehicle. It may for example be 50 km/h or 110 km/h.

For example, the speed limit is 50 km/h. Thus, the vehicle 1 is possibly in a four-wheel drive mode only below this speed limit. This corresponds well to the usual use of the four-wheel drive mode. At higher speed, the vehicle 1 is in a two-wheel drive mode (those wheels of the front axle 10), but thanks to the coupler, the power transmission 100 does not hinder the yield of the vehicle 1 in this operating mode.

For example, the speed limit is 110 km/h. Thus, the vehicle 1 is possibly in an electric or hybrid mode only below this speed limit. At higher speed, the vehicle 1 is in a thermal mode, but thanks to the coupler, the power transmission 100 does not hinder the yield of the vehicle 1 in this operating mode.

The invention claimed is:

1. A power transmission assembly for a vehicle comprising:

an electric machine comprising a stator fixed relative to the vehicle and a rotor movable in rotation relative to a rotation axis of said electric machine, and a differential comprising at least one differential input connected to the rotor of the electric machine, said differential comprising a plurality of cogwheels connected with each other to distribute the differential input power between:

a first output intended to be connected to a first power transmission shaft transmitting power to a first wheel, and a second output intended to be connected to a second power transmission shaft transmitting power to a second wheel, the distribution being a function of the rotation speed of the first output and second output, the cogwheels are distributed around the electric machine, the electric machine being located inside the space of the differential, the assembly being characterized in that:

the electric machine is an inverted machine in which the rotor is radially outside the stator with respect to the rotation axis;

wherein the differential includes the following cogwheel subassemblies;

a first epicyclic gearing arranged along the rotation axis AX on a first side of the electric machine, a second epicyclic gearing arranged along the rotation axis AX on a second side of the electric machine, and opposite the first side, and a linking mechanism which links the first epicyclic gearing to the second epicyclic gearing, the first and second epicyclic gearings being identical; and wherein the linking mechanism comprises a bevel pinion, the first epicyclic gearing comprising an outer crown gear with a complementary conical eating surface for meshing with the bevel pinion, and the second epicyelic gearing comprising an outer crown gear with a complementary bevel conical seating surface for meshing with the bevel pinion.

2. The assembly according to claim 1, wherein the rotor comprises:

a lateral flange which extends radially from the rotation axis, and a cylindrical part carrying magnets having alternating polarities in the circumferential direction of this cylindrical part, said magnets facing the windings of the stator.

3. The assembly according to claim 1, further comprising a coupler connected between the electric machine and the differential.

4. The assembly according to claim 3, wherein the coupler is a dog clutch or a clutch, said coupler being actuated by mechanical, hydraulic or electrical action.

5. The assembly according to claim 1, wherein the first epicyclic gearing comprises a planet gear carrier corresponding to the first output of the differential, the second epicyclic gearing comprises a planet gear carrier corresponding to the second output of the second epicyclic gearing, a drive shaft linking the inner sun gear, of the first epicyclic gearing, the inner sun gear of the second epicyclic gearing and the rotor of the electric machine, the drive shaft corresponding to the differential input.

6. The assembly according to claim 1, wherein the linking mechanism comprises:

a first pinion which meshes on the outside of an outer ring gear of the first epicyclic gearing, a first toothed shaft connected to the first pinion, a second pinion which meshes on the outside of an outer ring gear of the second epicyclic gearing, and a second toothed shaft connected to the second pinion, the first toothed shaft meshing with the second toothed shaft to link, by rotational direction reversal, the outer ring gear of the first epicyclic gearing and the outer ring gear of the second epicyclic gearing.

7. The assembly according to claim 6, further comprising a command actuator adapted to lead the rotation of the first toothed shaft or the second toothed shaft, so as to control the differential effect of the differential.

8. An assembly according to claim 1, further comprising a command actuator adapted to lead the rotation of the bevel pinion, so as to control the differential effect of the differential.

9. The vehicle comprising:

a front axle, a rear axle, and a power transmission assembly according to claim 1, the first output and the second output of the differential of this assembly being linked directly or indirectly respectively to the first power transmission shaft of the first wheel and to the second power transmission shaft of the second wheel, from the front axle and/or to the rear axle of the vehicle.

10. The vehicle according to claim 9, wherein:

the front axle is coupled to a first motor, and the transmission assembly is linked to the rear axle so as to obtain a four-wheel drive vehicle, or the rear axle is coupled to a first motor, and the transmission assembly is linked to the front axle so as to obtain a four-wheel drive vehicle.

11. The vehicle according to claim 9, wherein the assembly further comprises a coupler, and the coupler is placed in an uncoupled state if the speed of the vehicle is greater than a limit speed, adapted to the operating mode of the vehicle.

12. The vehicle according to claim 9, wherein the assembly further comprises a command actuator adapted to control the differential effect of the differential, and wherein a control electronics device of the vehicle controls this command actuator so as to control the direction or yaw angle of the vehicle.

* * * * *